(12) United States Patent
Hall et al.

(10) Patent No.: US 7,677,036 B2
(45) Date of Patent: Mar. 16, 2010

(54) HYDRAULIC ENERGY STORAGE WITH AN INTERNAL ELEMENT

(76) Inventors: David R. Hall, 2185 S. Larsen Pkwy., Provo, UT (US) 84606; David Wahlquist, 2185 S. Larsen Pkwy., Provo, UT (US) 84606; Francis Leany, 2185 S. Larsen Pkwy., Provo, UT (US) 84606

( * ) Notice: Subject to any disclaimer, the term of this patent is extended or adjusted under 35 U.S.C. 154(b) by 377 days.

(21) Appl. No.: 11/837,383

(22) Filed: Aug. 10, 2007

(65) Prior Publication Data

US 2009/0008173 A1 Jan. 8, 2009

Related U.S. Application Data

(63) Continuation-in-part of application No. 11/829,732, filed on Jul. 27, 2007, now abandoned, which is a continuation-in-part of application No. 11/773,561, filed on Jul. 5, 2007, which is a continuation-in-part of application No. 11/772,334, filed on Jul. 2, 2007, now Pat. No. 7,600,376.

(51) Int. Cl.
*F15B 15/00* (2006.01)

(52) U.S. Cl. ............................................ 60/413; 92/92

(58) Field of Classification Search .................. 60/413; 92/90, 92

See application file for complete search history.

(56) References Cited

U.S. PATENT DOCUMENTS

| | | | |
|---|---|---|---|
| 3,661,327 A | 5/1972 | Adamson | |
| 3,938,841 A | 2/1976 | Glance | |
| 4,098,083 A | 7/1978 | Carman | |
| 4,257,499 A | 3/1981 | Deschner | |
| 4,479,356 A | 10/1984 | Gill | |
| 4,616,392 A | 10/1986 | Snyder | |
| 4,784,362 A | 11/1988 | Wang | |
| 4,848,210 A | 7/1989 | Bissonnette | |
| 5,067,390 A * | 11/1991 | Negishi | 92/92 |
| 5,158,005 A * | 10/1992 | Negishi et al. | 92/92 |
| 5,201,262 A * | 4/1993 | Negishi et al. | 92/92 |
| 5,254,243 A | 10/1993 | Carr | |
| 5,263,401 A | 11/1993 | Walker | |
| 5,277,683 A * | 1/1994 | Wilkins | 482/129 |
| 5,509,938 A | 4/1996 | Phillips | |
| 5,511,759 A | 4/1996 | DeKraker | |
| 5,579,640 A | 12/1996 | Gray | |
| 6,146,114 A | 11/2000 | Nardacci | |
| 6,296,299 B1 | 10/2001 | Hanakawa | |
| 6,468,315 B1 | 10/2002 | Wilkinson | |
| 6,666,127 B2 * | 12/2003 | Peles | 92/90 |
| 7,100,895 B2 | 9/2006 | Schurz | |
| 7,104,052 B1 * | 9/2006 | Hindman | 60/413 |
| 7,121,089 B2 * | 10/2006 | Tosen et al. | 60/413 |
| 2004/0173396 A1 | 9/2004 | Rush | |

* cited by examiner

*Primary Examiner*—Thomas E Lazo
(74) *Attorney, Agent, or Firm*—Benjamin T. Miskin; Tyson J. Wilde

(57) ABSTRACT

In one aspect of the present invention, a system for performing work having a hydraulic circuit comprising a length of hose a hydraulic fluid in the circuit in communication with the hose, a hydraulic actuator for doing the work, at least one compressible element disposed within the hose, and a mechanism for pressurizing the hydraulic circuit such that at least 50 foot pounds of energy is stored within the hose to perform the work.

24 Claims, 12 Drawing Sheets

HYDRAULIC ENERGY STORAGE WITH AN INTERNAL ELEMENT

CROSS REFERENCE TO RELATED APPLICATIONS

This application is a continuation-in-part of U.S. patent application Ser. No. 11/829,732 which was filed on Jul. 27, 2007 now abandoned and entitled Expandable Vehicle Frame. U.S. patent application Ser. No. 11/829,732 is a continuation-in-part of U.S. patent application Ser. No. 11/773,561 which was filed on Jul. 5, 2007 and entitled Energy Storage in an Elastic Vessel. U.S. patent application Ser. No. 11/773,561 is a continuation-in-part of U.S. patent application Ser. No. 11/772,334 which was filed on Jul. 2, 2007 now U.S. Pat. No. 7,600,376 and entitled Energy Storage. This application is inhere incorporated by reference for all that is disclosed.

BACKGROUND OF THE INVENTION

The current invention relates to hydraulic systems for performing work. Hydraulic systems are used in many different applications such as automobiles, trucks, construction equipment, elevators, submarines, and many others. Hydraulic systems may be used to improve such areas as fuel efficiency and power output of mechanical systems which require energy to perform various forms of work, such as lifting payloads, propelling vehicles, or raising elevators. In some applications, it may be desirous to have energy storage in the hydraulic system to provide extra energy when needed.

In hydraulic circuits, hydraulic accumulators have been used to store excess hydraulic fluid. These hydraulic accumulators may comprise an elastic bladder within a rigid chamber. A compressible medium such as a gas may be disposed within the chamber outside of the elastic bladder, while the hydraulic fluid may be disposed within the elastic bladder. When the volume of hydraulic fluid in the bladder increases, the bladder compresses against the compressible medium thereby generating a potential energy within the rigid chamber which is stored outside of the elastic bladder.

An example of such is U.S. Pat. No. 4,166,478 to Sugimura et al., which is herein incorporated by reference for all that it contains, and discloses a hydropneumatic accumulator comprising a rigid upright vessel, the mouth of which is at the bottom, containing an inverted bag-like bladder. The mouths of the vessel and the bladder are sealed to one another. The bladder extends upwardly within the vessel interior and divides the same into inner and outer compartments which respectively contain an incompressible liquid medium and a compressible gaseous medium. Diaphragm and piston accumulators are also common.

BRIEF SUMMARY OF THE INVENTION

In one aspect of the present invention, a system for performing work having a hydraulic circuit comprising a length of hose a hydraulic fluid in the circuit in communication with the hose, a hydraulic actuator for doing the work, at least one compressible element disposed within the hose, and a mechanism for pressurizing the hydraulic circuit such that at least 50 foot pounds of energy is stored within the hose to perform the work.

In some embodiments, a material of the hose may store at least 50% of the energy. A material of the hose may store at least 75% of the energy. A material of the at least one compressible element may store at least 10% of the energy. A material of the at least one compressible element may store at least 50% of the energy.

The hydraulic fluid may be incompressible. In some embodiments the hydraulic fluid may be compressible and at least 10% of the energy may be stored in the hydraulic fluid.

The hose may comprise a rigid portion or the hose may be rigid. The hose may comprise a material selected from the group consisting of composite material, Kevlar, polyurethane, polyethylene, Twaron, aramid fiber, nylon, rubber, carbon, synthetic polymers, chloroprene, elastomers, polyester, silicone rubber, rubber foam, carbon fiber, glass fiber, aluminum, copper, titanium, steel or a combination thereof.

The at least one compressible element may comprise a grooved surface. The at least one compressible element may comprise a material selected from the group consisting of composite material, Kevlar, polyurethane, polyethylene, Twaron, aramid fiber, nylon, rubber, carbon, synthetic polymers, chloroprene, elastomers, polyester, carbon fiber, glass fiber, syntactic foam, polyurethane foam, silicone rubber, rubber foam, inert gas or a combination thereof. A material of the at least one compressible element may have a smaller density than a density of the hydraulic fluid. A material of the at least one compressible element may have a lower bulk modulus than the hydraulic fluid.

The at least one compressible element may comprise at least 5% of an inside volume of the hose. The at least one compressible element may comprise at least 40% of an inside volume of the hose.

The hose may be inflated and the at least one compressible element may be compressed by the hydraulic fluid to over 1,000 psi. The hose may be inflated and the at bast one compressible element may be compressed by the hydraulic fluid to over 6,000 psi. The at bast one compressible element may be compressed by the hydraulic fluid to over 6,000 psi while the hose remains rigid.

The system may comprise a plurality of compressible elements. The system is incorporated in a automobile, golf cart, a truck, an elevator, backhoe, bulldozer, trencher, milling machine, a boat, construction equipment, or a combination thereof.

In one aspect of the present invention, a system for performing work having a hydraulic circuit comprising a length of hose a hydraulic fluid in the circuit in communication with the hose, a hydraulic actuator for doing the work, at least one compressible element disposed within the hose, and a mechanism for pressurizing the hydraulic circuit such that at least 50 foot pounds of energy is stored within the hose to perform the work.

DETAILED DESCRIPTION OF THE INVENTION AND THE PREFERRED EMBODIMENT

Figure 1:
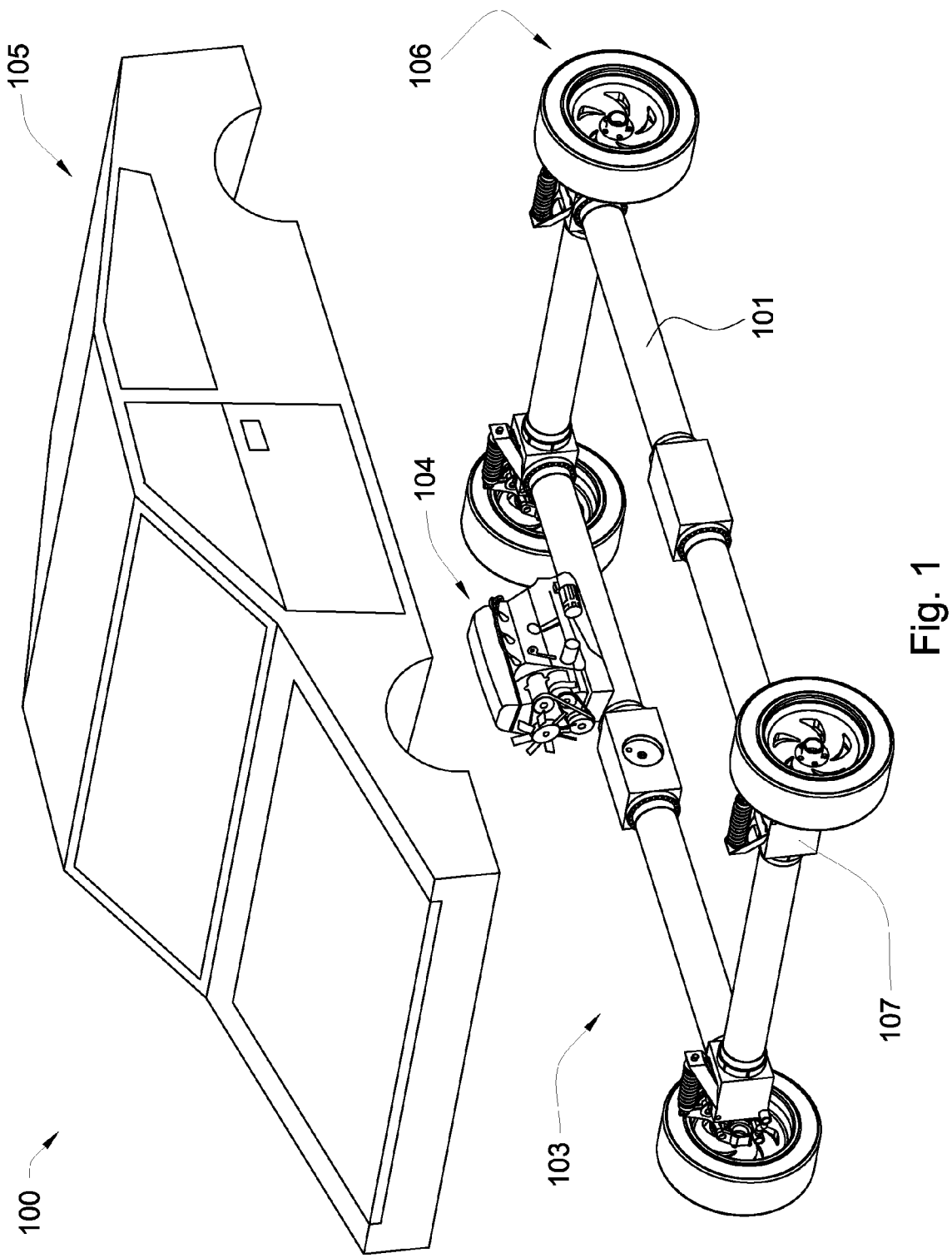
FIG. 1 is an exploded diagram of an embodiment of an automobile.

The current invention may be incorporated into a vehicle 100 such as an automobile, as in the embodiment of FIG. 1. A plurality of hose segments 101 may be incorporated into the system 103, connected by a plurality of manifolds 107. The manifolds 107 may be proximate translation assemblies 106 or an engine 104. The engine 104 may power the pressurizing mechanism 1003. The translation assemblies 106 may be in mechanical communication with individual hydraulic actuators disposed within the manifolds 107.

Figure 2:
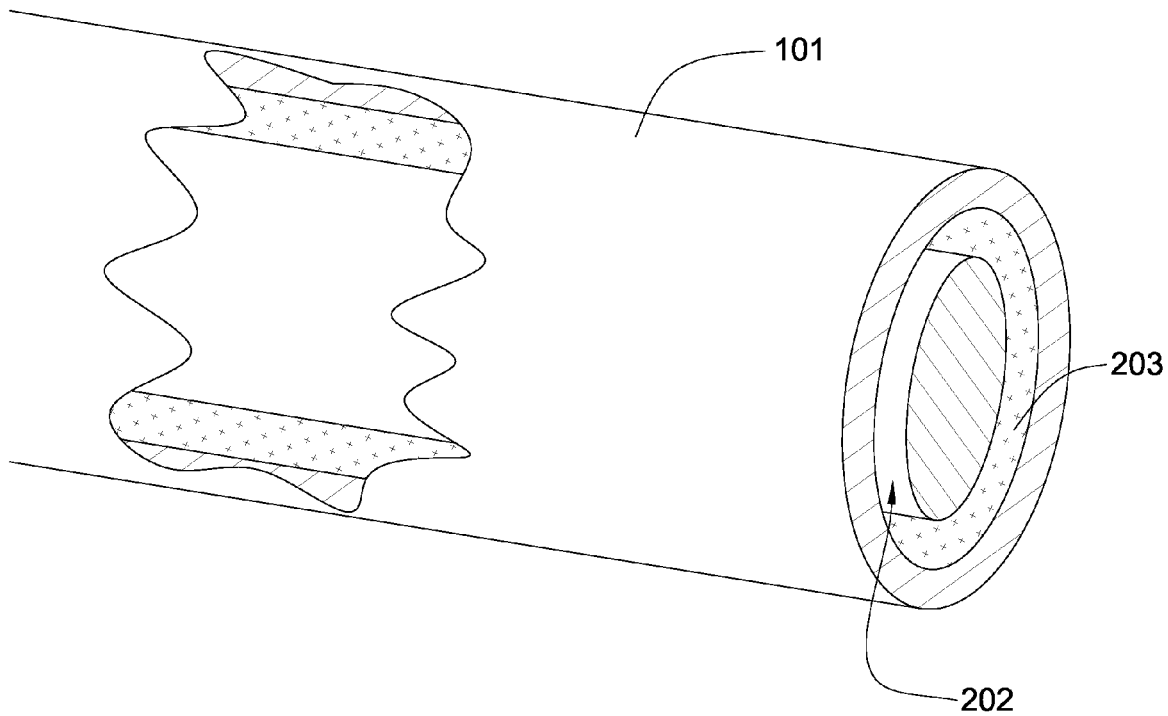
FIG. 2 is a cross-sectional diagram of an embodiment of a hose.

Referring now to FIG. 2, the hose segments 101 may comprise a material selected from the group consisting of composite material, Kevlar, polyurethane, polyethylene, Twaron, aramid fiber, nylon, rubber, carbon, synthetic polymers, chloroprene, elastomers, polyester, silicone rubber, rubber foam, carbon fiber, glass fiber, aluminum, copper, titanium, steel or a combination thereof.

A internal element 202 is disposed within the hose 101 and may comprise at least 40 percent of an inside volume of the hose. In other embodiments, the internal element may comprise more than 3 percent of the inside volume. The internal element may be a compressive element. The internal element 202 may comprise a material selected from the group consisting of composite material, Kevlar, polyurethane, polyethylene, Twaron, aramid fiber, nylon, rubber, carbon, synthetic polymers, chloroprene, elastomers, polyester, carbon fiber, glass fiber, syntactic foam, polyurethane foam, silicone rubber, rubber foam, inert gas or a combination thereof. The internal element 202 may have a homogenous composition. In some embodiments, the internal element may be a composite material. Hydraulic fluid 203 may occupy the remaining volume within in the hose 101 intermediate the internal element 202 and the hose 101. The internal element 202 may be less dense than the hydraulic fluid 203 and/or the internal element 202 may have a lower bulk modulus than the hydraulic fluid 203 thereby reducing the weight of the system 103 and increasing the efficiency of the vehicle 100.

Figure 3A:
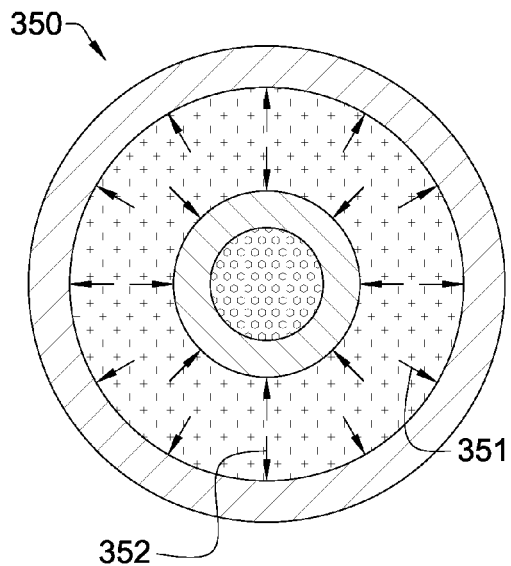
FIG. 3a is a cross-sectional diagram of another embodiment of a hose.
Figure 3B:
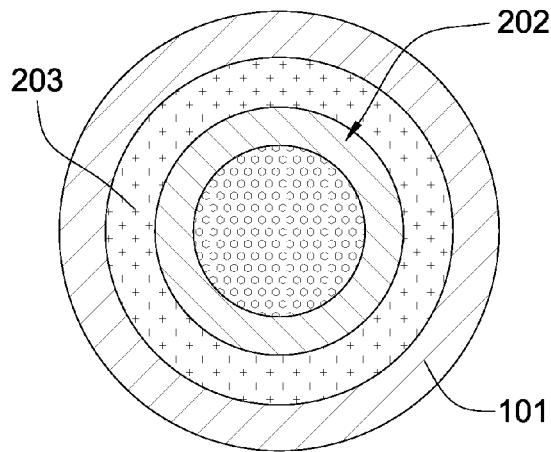
FIG. 3 is a cross-sectional diagram of another embodiment of a hose.
Figure 3:
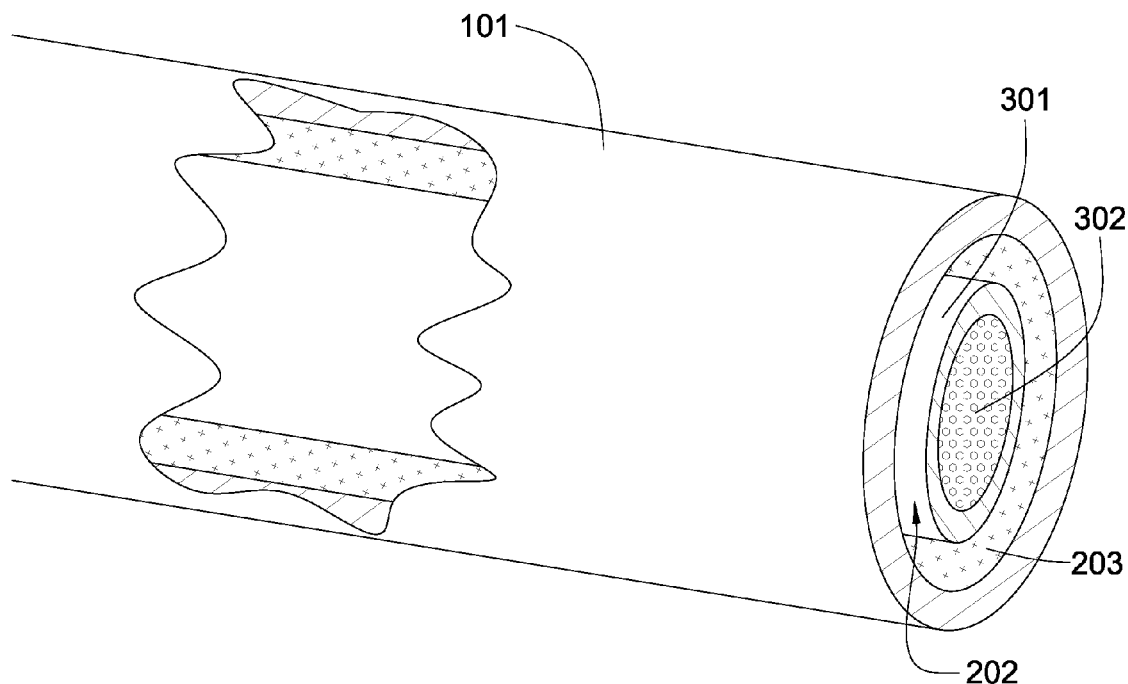

The internal element 202 may also comprise syntactic foam 302, rubber foam 302 or polyurethane foam 302 disposed in a continuous rubber tube 301 disposed within the hose 101 throughout the entire length of the hose 101 as disclosed in the embodiment of FIG. 3. The tube 301 may also contain inert gas 302 in place of the foam 302.

Referring now to FIGS. 3a through 3b, when the pressurizing mechanism 1003 is activated 350 hydraulic fluid 203 is pumped into the hose segments 101 pressurizing the system 103 to at least 1,000 to 6,000 psi and at least 50 foot pounds of energy is stored in the system 103. As the pressure increases, the hose segments 101 elastically expand 351 and the internal element 202 may elastically compresses 352 as disclosed in FIG. 3a. At least 50 to 75 percent of the energy of the system 103 may be stored in the elastic expansion 351 of the hose 101 and 10 to 50 percent of the energy of the system 103 may be stored in the elastic compression 352 of the compressive element 202. The hydraulic fluid 203 may be substantially incompressible or compressible. When compressible hydraulic fluid 202 is utilized in the system 103 at least 10 percent of the energy in the pressurized system 103 may be stored in the hydraulic fluid 202. When the pressure is released from the system 103 the hose segments 101 and the internal element 202 may elastically return to their original dimensions as disclosed in FIG. 3b.

Figure 4:
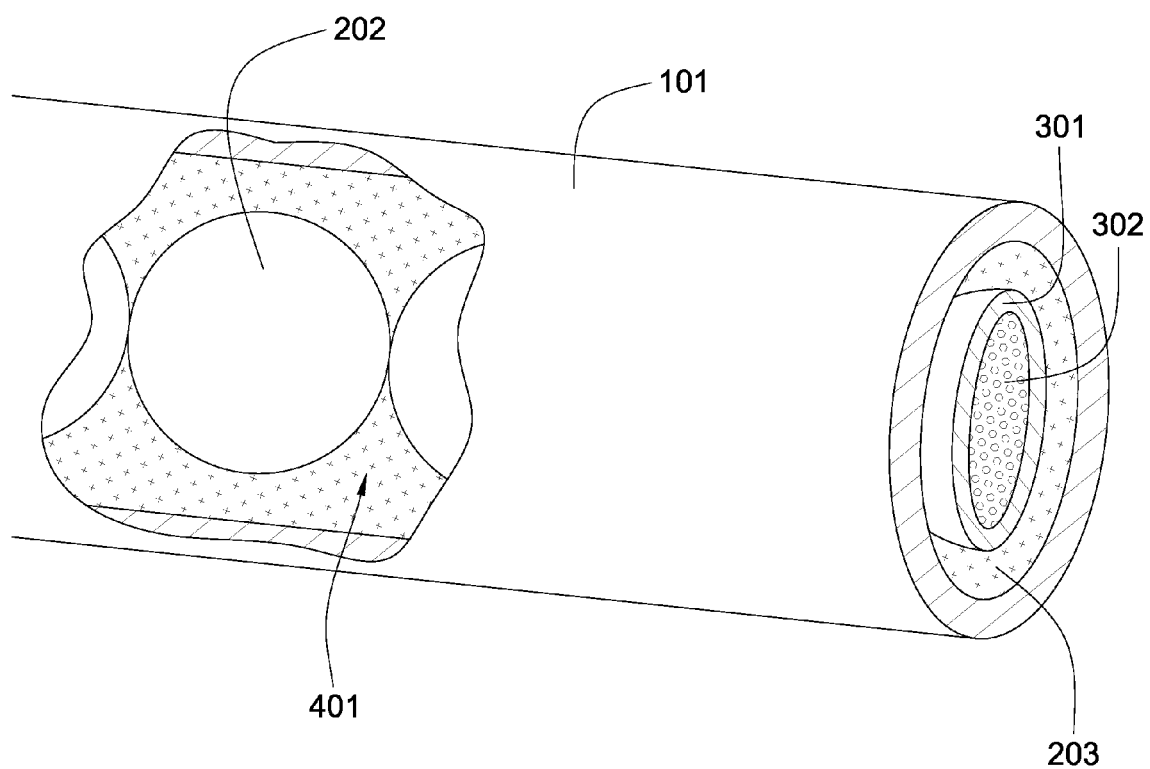
FIG. 4 is a cross-sectional diagram of another embodiment of a hose.

Referring to the embodiment of FIG. 4, the hose 101 may also contain a plurality 401 of internal elements 202. The plurality 401 of internal elements 202 may have a spherical geometry. Each internal element 202 of the plurality 401 of internal elements 202 may comprise at least 5 percent of the inside volume of the hose 101. It is believed that the plurality 401 of spherical internal elements 202 may increase the overall surface area of the internal element 202 enabling the internal element 202 to store more energy in the system 103.

Figure 5:
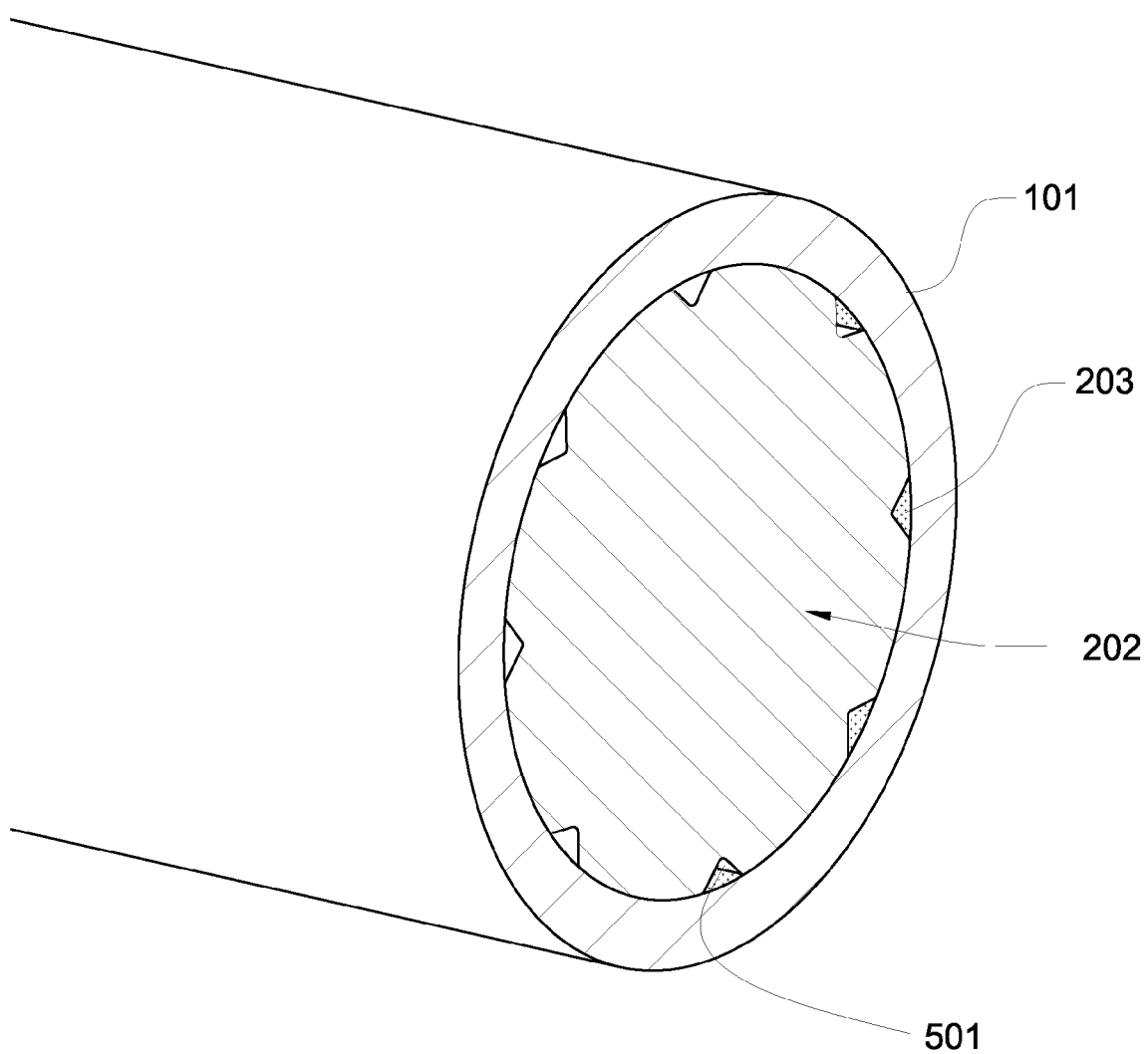
FIG. 5 is a cross-sectional diagram of another embodiment of a hose.

FIG. 5 discloses an embodiment of the current invention wherein the internal element 202 may have a grooved surface 501. A grooved surface 501 on the internal element 202 may also enable the internal element 202 to store more energy by increasing the surface area of the internal element 202. The internal element may also be pressurized. This may be accomplished in some embodiments by placing the internal element within the hose and then pressurizing it until it expands against the internal diameter of the hose. Subsequent fluid added to the hose may then pressurize the entire system and thereby store more energy overall, since the energy may be stored in the hose wall, in the internal element, and also in the fluid itself.

Figures 6A, 6B:
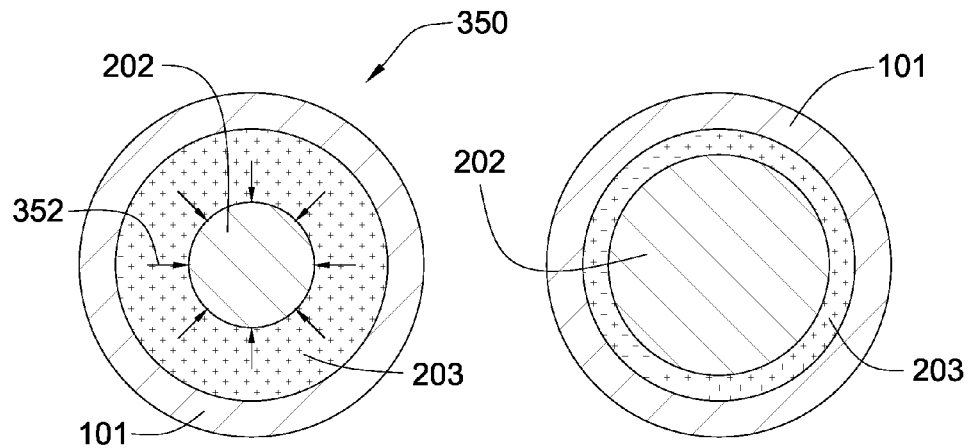
FIG. 6a is a cross-sectional diagram of another embodiment of a hose.
Figure 6:
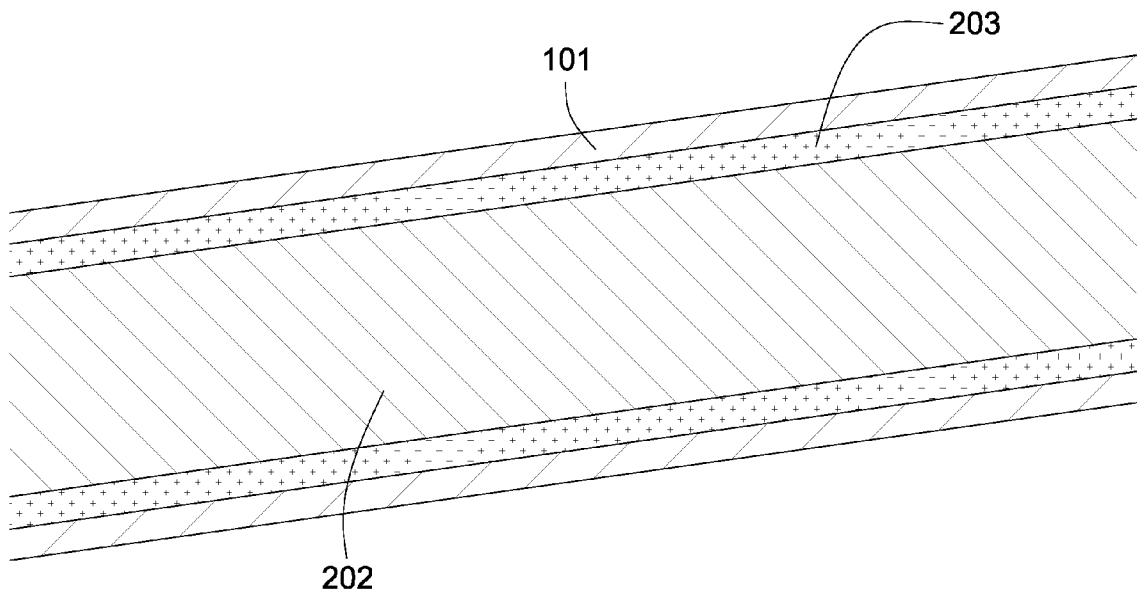
FIG. 6 is a cross-sectional diagram of another embodiment of a hose.

Referring now to the embodiment of FIG. 6, the hose segments 101 may comprise a rigid material such as aluminum, titanium, steel, stainless steel, or combinations thereof. Referring to FIGS. 6a through 6b, when the pressurizing mechanism is activated 350 hydraulic fluid 203 is pumped into the hose segments 101 pressurizing the system 103 to at least 1,000 to 6,000 psi and at least 50 foot pounds of energy is stored in the system 103. As the pressure increases, the internal element 202 is elastically compressed 352 as disclosed in FIG. 6a. At least 80 to 100 percent of the energy of the system 103 may be stored in the elastic compression 352 of the internal element 202, at least 0 to 10 percent of the energy may be stored in the hydraulic fluid 203, and less than 10 percent of the energy is stored in the material of the hose 101. When the pressure is released from the system 103 the internal element 202 may elastically return to its original dimensions as disclosed in FIG. 6b. Rigid hoses 101 may be useful to enhance the strength and rigidity of the vehicle's frame.

Figure 7:
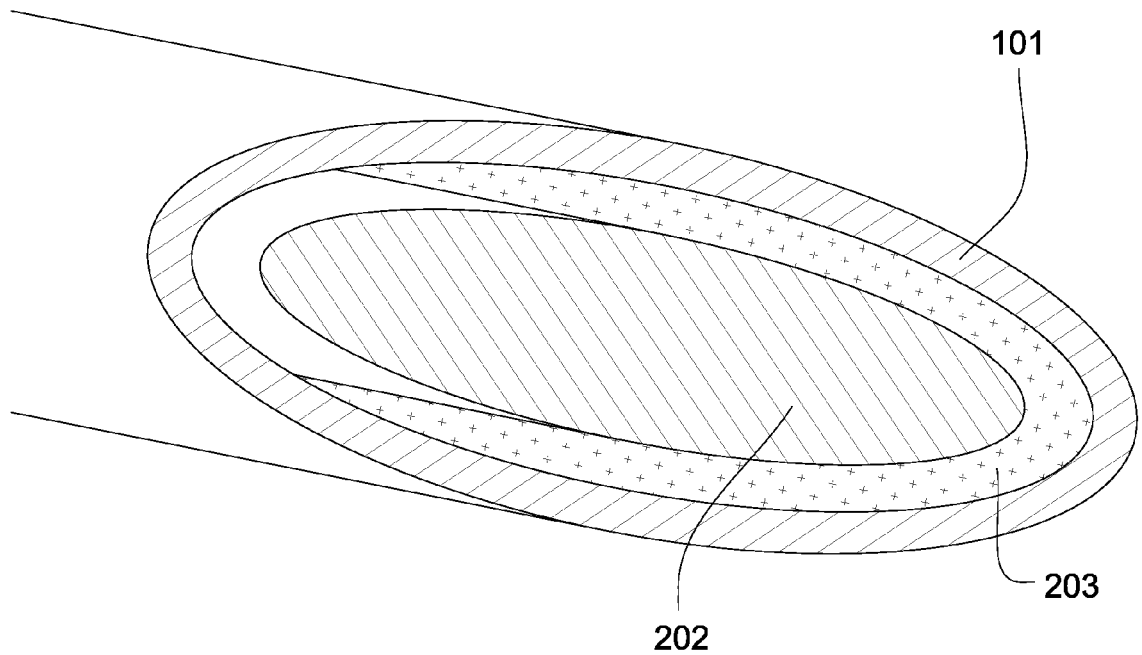
FIG. 7 is a cross-sectional diagram of another embodiment of a hose.

FIG. 7 discloses an embodiment of the current invention wherein the hose 101 and internal element 202 comprise an oval geometry.

Figure 8:
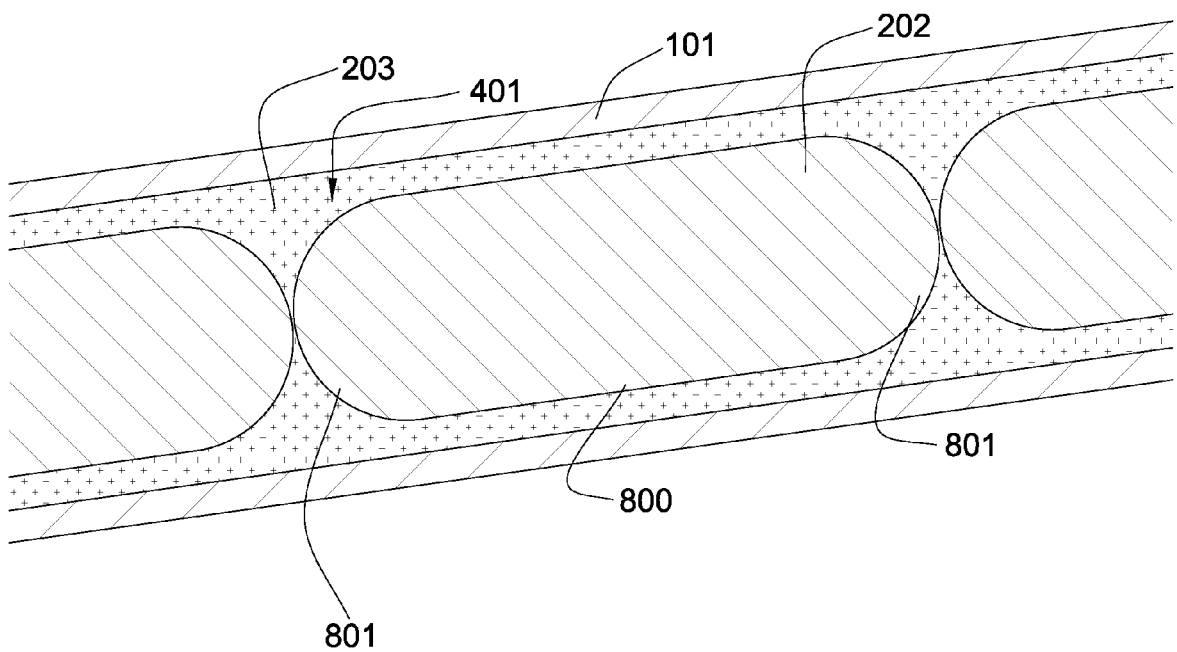
FIG. 8 is a cross-sectional diagram of another embodiment of a hose.

Referring to the embodiment of FIG. 8, the plurality 401 of internal elements 202 may have a long, cylindrical geometry 800. The cylindrical geometry 800 of the internal elements 202 may end in a spherical geometry 801 at the ends 801 of the internal elements 202.

Figure 9:
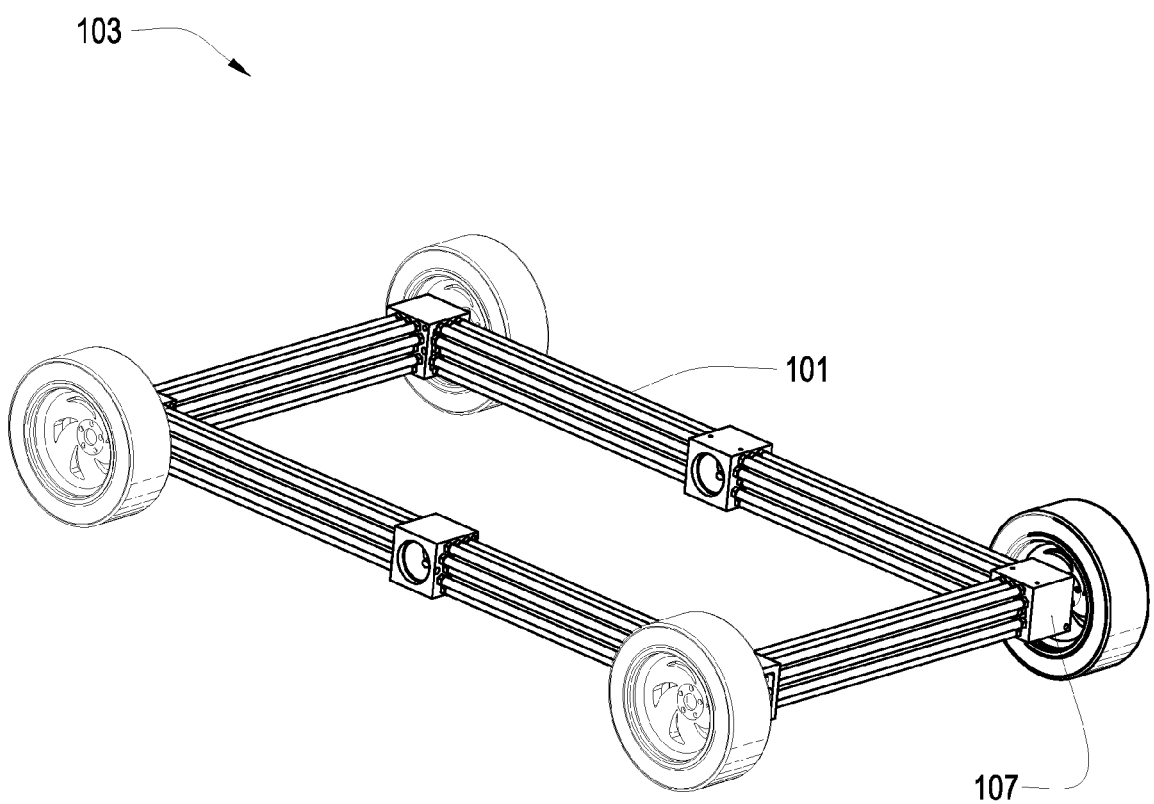
FIG. 9 is a perspective diagram of another embodiment of a vehicle frame.

The system 103 may comprise a plurality of hoses 101 aligned parallel to one another in a vehicle 100, as in the embodiment of FIG. 9. This alignment may allow air to flow between the hoses 101, which may cool the hydraulic fluid within the hoses 101. In some embodiments, the length of hose 101 may be at least 50 cumulative feet. In other embodiments, the length of hose 101 is over 200 or 400 cumulative feet.

Figure 10:
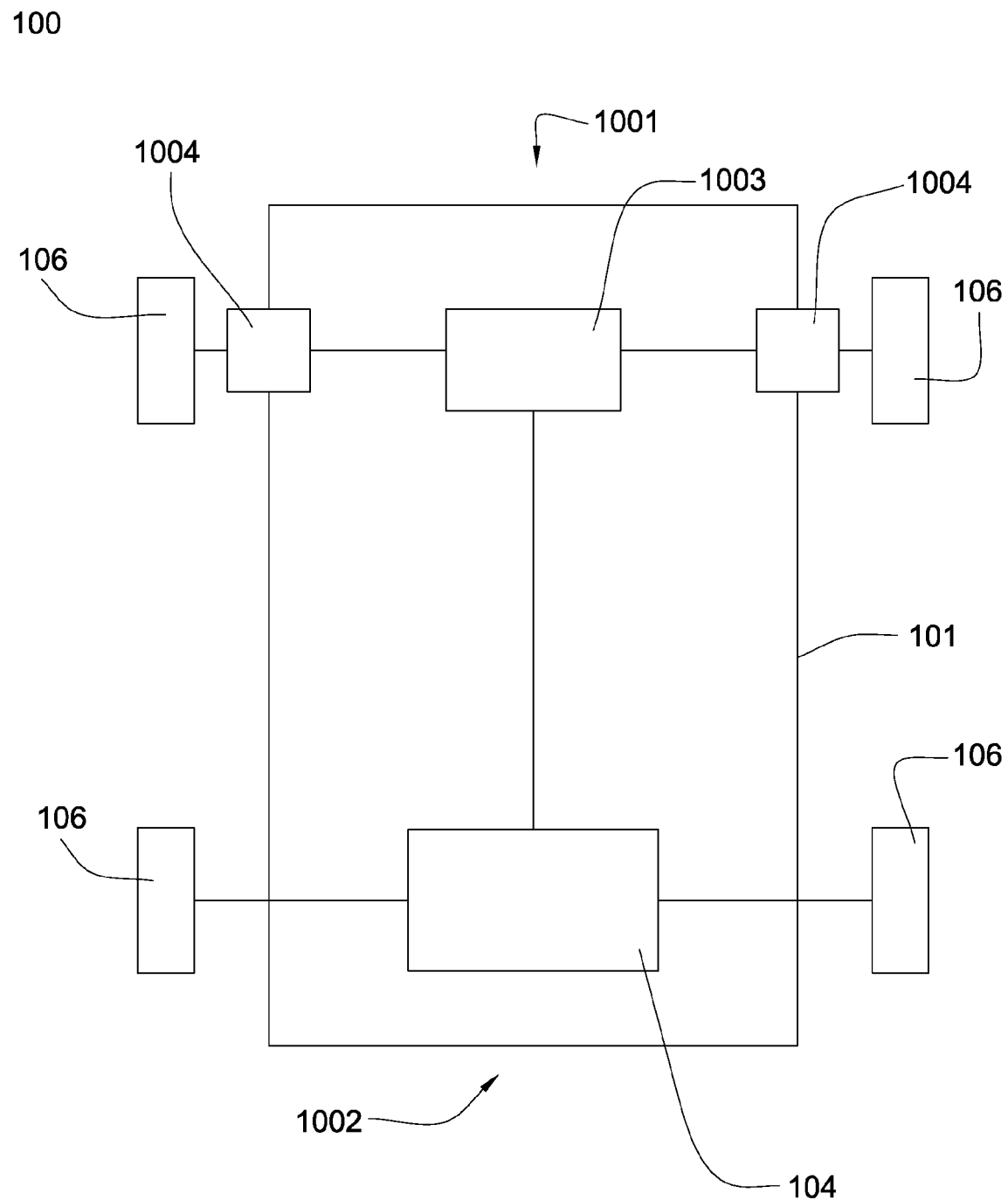
FIG. 10 is a diagram of another embodiment of a hydraulic system.

The current invention may be incorporated into a vehicle 100 such as an automobile, as in the embodiment of FIG. 10. The hose segments 101 may be disposed within the frame of the vehicle 100 and the hoses 101 are in communication with two hydraulic actuators 1004 proximate the front end 1001 of the vehicle 100. The hydraulic actuators 1004 may be in mechanical communication with the two front 1001 translation assemblies. The engine 104, disposed proximate the rear 1002 of the vehicle 100, may power the pressurizing mechanism 1003 disposed proximate the front end 1001 of the vehicle 100. The engine 104 may be in direct mechanical communication with the two rear 1002 translation assemblies 106 and may directly power the two rear 1002 translation assemblies 106. The pressurizing mechanism 1003 may pressurize the hoses 101 thereby storing energy in the system 103. When the vehicle may need to accelerate, the hoses 101 may release the hydraulic fluid 203 into the hydraulic actuators 1004 which power the front 1001 translation assemblies 106.

Figure 11:
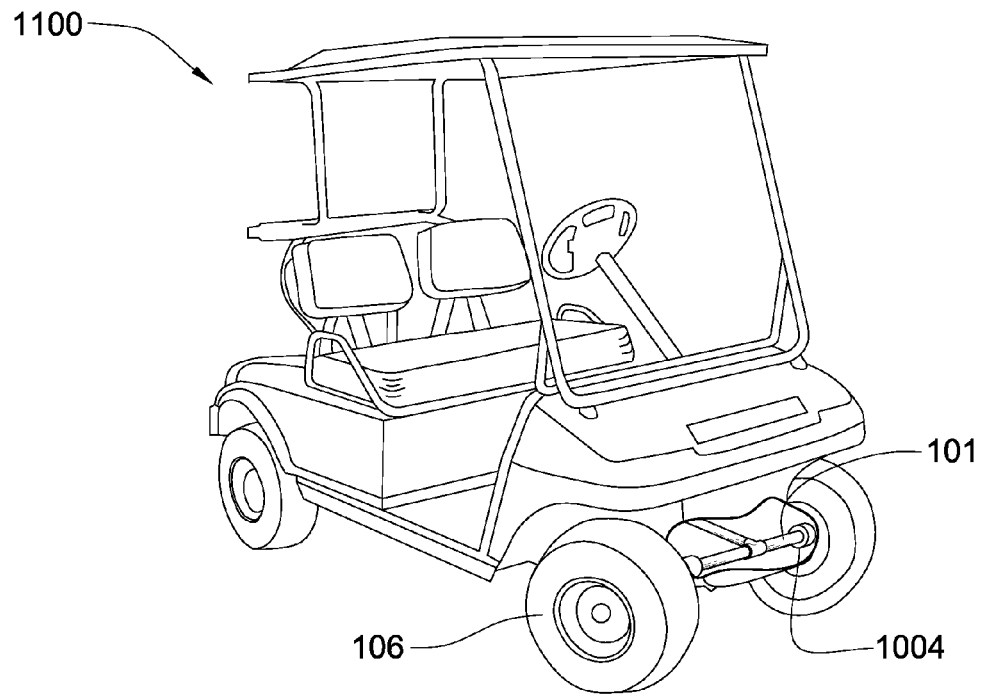
FIG. 11 is an orthogonal diagram of an embodiment of a golf cart.

The system 103 may be used in a golf cart 1100, as in the embodiment of FIG. 11. The system may comprise a plurality of hoses 101 in communication with hydraulic actuators 1004, such as a pump, proximate and in communication with each translation assembly 106.

Figure 12:
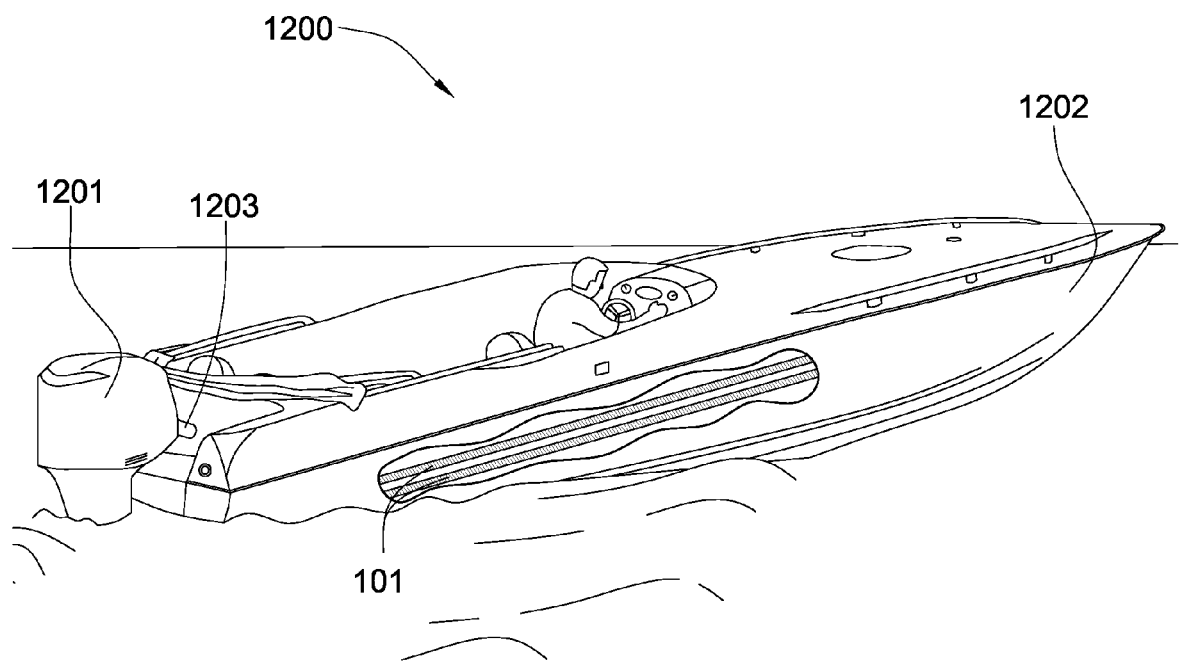
FIG. 12 is a perspective diagram of an embodiment of a boat.

The system 103 may provide extra energy to a motor 1201 of a boat 1200, as in the embodiment of FIG. 12. A plurality of hoses 101 may be disposed within a body 1202 of the boat 1200, with a connecting hose 1203 from the body 1202 to the motor 1201.

Figure 13:
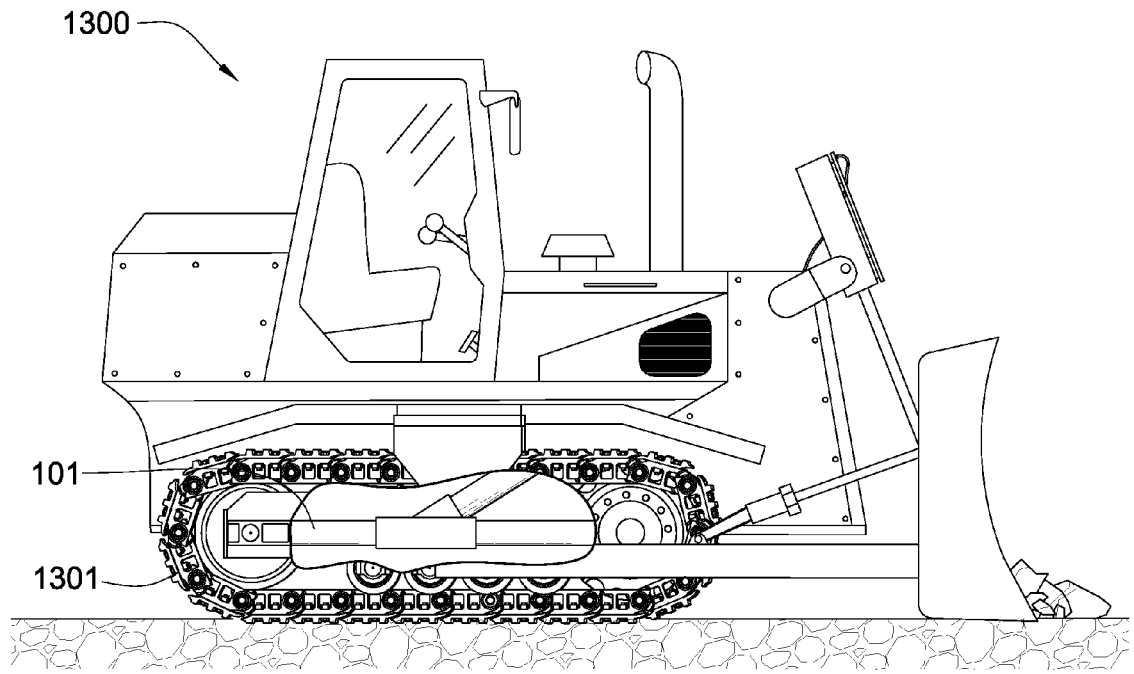
FIG. 13 is a perspective diagram of an embodiment of a bulldozer.

The system 103 may be particularly useful in embodiments where large amounts of force are required for short periods of time. An extra burst of energy from the energy stored in the hose 101 may be useful when peak amounts of energy are required. Referring to FIG. 13, the system 103 may be used to provide extra energy for a bulldozer 1300. The system 103 may comprise a plurality of hoses 101 that connect to a rotary mechanism that drives the tracks 1301. These hoses 101 may be connected to an engine of the bulldozer which may pressurize the hoses 101 to store over 50 foot pounds of energy.

Figure 14:
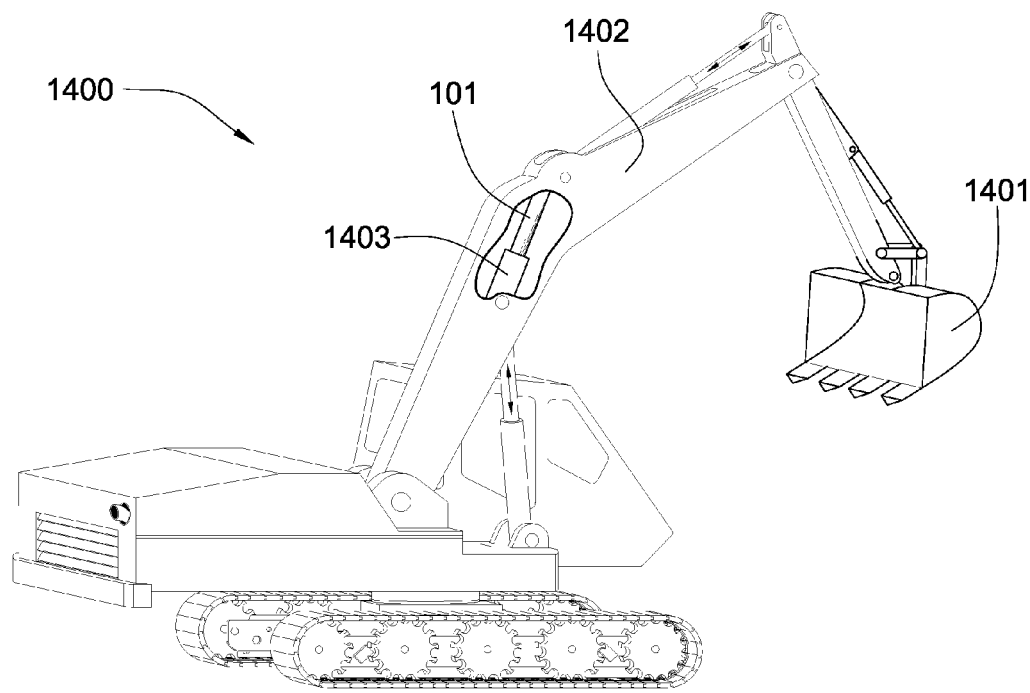
FIG. 14 is a perspective diagram of an embodiment of a backhoe.

Now referring to FIG. 14, the system 103 may provide energy to an articulated arm 1402 carrying a bucket 1401 of a backhoe 1400, wherein the pressurizing mechanism 1403 and hose 101 may be disposed within the arm 1402. The system 103 may provide additional energy for the bulldozer 1300 or backhoe 1400 when a high amount of initial force is required to lift or move large or heavy loads.

The system 103 may also provide energy for other vehicles such as trucks, trenchers, milling machines, construction equipment, doom buggies, motorcycles, recreational vehicles, garbage trucks, delivery vehicles, postal vehicles, law enforcement vehicles, bicycles, elevators or a combination thereof. In general the present invention may be ideal for vehicles which do a lot of starting and stopping such as garbage trucks and delivery vehicles. In some embodiments, a trailer may also incorporate the present invention to aid the vehicle pulling the trailer during acceleration.

Whereas the present invention has been described in particular relation to the drawings attached hereto, it should be understood that other and further modifications apart from those shown or suggested herein, may be made within the scope and spirit of the present invention.

What is claimed is:

1. A system for performing work, comprising:
    a hydraulic circuit adapted to store at least 50 foot pounds of energy within a length of hose;
    a hydraulic fluid in the circuit in communication with the hose and with a hydraulic actuator for doing the work;
    a mechanism for pressurizing the hydraulic circuit in order to perform the work; and
    at least one compressible element is disposed within the length of hose;
    wherein the system is incorporated in a automobile, golf cart, a truck, an elevator, backhoe, bulldozer, trencher, milling machine, a boat, construction equipment, a vehicle, or a combination thereof.

2. The system of claim 1, wherein a material of the at least one compressible element has a smaller density than a density of the hydraulic fluid.

3. The system of claim 1, wherein a material of the at least one compressible element has a lower bulk modulus than the hydraulic fluid.

4. The system of claim 1, wherein a material of the hose stores at least 50% of the energy.

5. The system of claim 1, wherein a material of the hose stores at least 75% of the energy.

6. The system of claim 1, wherein a material of the at least one compressible element stores at least 10% of the energy.

7. The system of claim 1, wherein a material of the at least one compressible element stores at least 50% of the energy.

8. The system of claim 1, wherein the hydraulic fluid is incompressible.

9. The system of claim 1, wherein the hydraulic fluid is compressible.

10. The system of claim 7, wherein at least 10% of the energy is stored in the hydraulic fluid.

11. The system of claim 1, wherein the hose comprises a rigid portion.

12. The system of claim 1, wherein the hose is rigid.

13. The system of claim 1, wherein the hose comprises a material selected from the group consisting of composite material, Kevlar, polyurethane, polyethylene, Twaron, aramid fiber, nylon, rubber, carbon, synthetic polymers, chloroprene, elastomers, polyester, silicone rubber, rubber foam, carbon fiber, glass fiber, aluminum, copper, titanium, steel and a combination thereof.

14. The system of claim 1, wherein the at least one compressible element comprises a material selected from the group consisting of composite material, Kevlar, polyurethane, polyethylene, Twaron, aramid fiber, nylon, rubber, carbon, synthetic polymers, chloroprene, elastomers, polyester, carbon fiber, glass fiber, syntactic foam, polyurethane foam, silicone rubber, rubber foam, inert gas and a combination thereof.

15. The system of claim 1, wherein the at least one compressible element comprises at least 5% of an inside volume of the hose.

16. The system of claim 1, wherein the at least one compressible element comprises at least 40% of an inside volume of the hose.

17. The system of claim 1, wherein the at least one compressible element comprises a grooved surface.

18. The system of claim 1, wherein the hose is inflated and the at least one compressible element is compressed by the hydraulic fluid to over 1,000 psi.

19. The system of claim 1, wherein the hose is inflated and the at least one compressible element is compressed by the hydraulic fluid to over 6,000 psi.

20. The system of claim 1, wherein the at least one compressible element is compressed by the hydraulic fluid to over 6,000 psi and the hose remains rigid.

21. The system of claim 1, wherein the system comprises a plurality of compressible elements.

22. The system of claim 1, wherein the system is incorporated into a vehicle frame.

23. The system of claim 1, wherein the internal element is pressurized.

24. A system for performing work, comprising:

a hydraulic circuit adapted to store at least 50 foot pounds of energy within a length of hose;

a hydraulic fluid in the circuit in communication with the hose and with a hydraulic actuator for doing the work;

a mechanism for pressurizing the hydraulic circuit in order to perform the work; and at least one internal element is disposed within the length of hose wherein the at least one internal element weighs less than the hydraulic fluid;

wherein the system is incorporated in a automobile, golf cart, a truck, an elevator, backhoe, bulldozer, trencher, milling machine, a boat, construction equipment, a vehicle, or a combination thereof.

* * * * *